US009336962B2

(12) United States Patent
Wudtke et al.

(10) Patent No.: US 9,336,962 B2

(45) Date of Patent: May 10, 2016

(54) ACTION BUTTON APPARATUS

(75) Inventors: Karl Wudtke, Las Vegas, NV (US); Bryan Kelly, Alamo, CA (US); Micheal Shackelford, Las Vegas, NV (US); Vernon Bernard, Henderson, NV (US); Michael Stacey, Las Vegas, NV (US); John Garofalo, Las Vegas, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 1137 days.

(21) Appl. No.: 12/163,968

(22) Filed: Jun. 27, 2008

(65) Prior Publication Data

US 2009/0325695 A1 Dec. 31, 2009

(51) Int. Cl.

*G06F 17/00* (2006.01)
*H01H 9/18* (2006.01)
*G07F 17/32* (2006.01)
*G07F 17/34* (2006.01)
*H01H 13/52* (2006.01)

(52) U.S. Cl.

CPC ........... *H01H 9/182* (2013.01); *G07F 17/3209* (2013.01); *G07F 17/34* (2013.01); *H01H 13/52* (2013.01)

(58) Field of Classification Search

CPC .................................................... G07F 17/3209
USPC .......................................... 463/20, 21, 36–37
See application file for complete search history.

(56) References Cited

U.S. PATENT DOCUMENTS

| | | | | |
|---|---|---|---|---|
| 5,278,362 | A * | 1/1994 | Ohashi | 200/5 A |
| 5,938,529 | A * | 8/1999 | Rodesch et al. | 463/20 |
| 6,454,649 | B1 * | 9/2002 | Mattice et al. | 463/17 |
| 7,628,692 | B2 * | 12/2009 | Kaminkow | 463/20 |
| 7,628,701 | B2 * | 12/2009 | Wells | 463/37 |
| 7,775,872 | B2 * | 8/2010 | Bleich et al. | 463/20 |
| 7,828,649 | B2 * | 11/2010 | Cuddy et al. | 463/26 |
| 8,174,495 | B2 * | 5/2012 | Takashima et al. | 345/156 |

(Continued)

FOREIGN PATENT DOCUMENTS

| | | | |
|---|---|---|---|
| EP | 1923848 | A1 | 5/2008 |
| JP | 2000-123677 | A | 4/2000 |
| JP | 2002-279500 | A | 9/2002 |

OTHER PUBLICATIONS

Gizmodo / Brian Lam, "Exclusive Video of Optimus Mini Keyboard Doubling as a Slot Machine" , with a date of Aug. 21, 2006 text and video currently available at http://gizmodo.com/195552/exclusive-video-of-optimus-mini-keyboard-doubling-as-slot-machine; and also www.archive.org with verified date of Aug. 24, 2006.*

*Primary Examiner* — Paul A D'Agostino

(74) *Attorney, Agent, or Firm* — Marvin A. Hein; Philip J. Anderson

(57) ABSTRACT

The claimed embodiments contemplate methods, systems and apparatuses directed to an active display button. In various embodiments, an active display button may generally be a button containing one or more elements that move when the button is engaged. By example, and not limitation, these elements may include one or more reels, be they mechanical or video, or perhaps a rotating indicator. The active display button may also include lights, vibratory motors and other experience-enhancing implements. The active display button may be installed on a gaming machine and operated in conjunction with the gaming device, separate from the gaming machine on which it is installed or perhaps as part of the operation of the gaming machine.

23 Claims, 22 Drawing Sheets

(56) References Cited

U.S. PATENT DOCUMENTS

| | | | | |
|---|---|---|---|---|
| 8,235,789 | B2 * | 8/2012 | Rasmussen | 463/20 |
| 2002/0173354 | A1 * | 11/2002 | Winans et al. | 463/20 |
| 2004/0038721 | A1 * | 2/2004 | Wells | 463/16 |
| 2004/0266516 | A1 * | 12/2004 | Thomas | G07F 17/3262 463/20 |
| 2004/0266517 | A1 * | 12/2004 | Bleich et al. | 463/20 |
| 2005/0230233 | A1 * | 10/2005 | Hoehne et al. | 200/314 |
| 2006/0026536 | A1 * | 2/2006 | Hotelling et al. | 715/863 |
| 2006/0073887 | A1 * | 4/2006 | Nguyen et al. | 463/27 |
| 2006/0166728 | A1 | 7/2006 | Cornell et al. | |
| 2006/0189380 | A1 * | 8/2006 | Schultz | G07F 17/34 463/20 |
| 2007/0077990 | A1 * | 4/2007 | Cuddy et al. | 463/25 |
| 2007/0097073 | A1 * | 5/2007 | Takashima et al. | 345/156 |
| 2008/0032766 | A1 * | 2/2008 | Okada | 463/20 |
| 2008/0113766 | A1 * | 5/2008 | Waxman et al. | 463/25 |
| 2008/0132313 | A1 * | 6/2008 | Rasmussen et al. | 463/16 |
| 2009/0275406 | A1 * | 11/2009 | Bytnar et al. | 463/30 |
| 2009/0291749 | A1 * | 11/2009 | Durham et al. | 463/25 |
| 2009/0312083 | A1 * | 12/2009 | Rasmussen | 463/20 |

* cited by examiner

ACTION BUTTON APPARATUS

BACKGROUND

Various types of gaming machines have been developed with features designed to captivate and maintain player interest. In general, a gaming machine allows a player to play a game of chance in exchange for a wager. Depending on the outcome of the game, the player may be entitled to an award which is paid to the player by the gaming machine, normally in the form of currency or game credits. Gaming machines may include flashing displays, lighted displays or sound effects to capture a player's interest in a gaming device.

Another important feature of maintaining player interest in a gaming machine includes providing the player with many opportunities to win awards such as cash or prizes. For example, in some slot machines, the display windows show more than one adjacent symbol on each reel, thereby allowing for multiple-line betting. Some gaming machines offer a player an opportunity to win millions large prizes by providing progressive jackpots. Additionally, feature games of various types have been employed to reward players above the amounts typically awarded on a standard game pay schedule. Generally, such feature games are triggered by predetermined events such as one or more appearances of certain combinations of indicia in a primary game. In order to simulate interest, feature games are typically set to occur at a gaming machine on a statistical cycle based upon the number of primary game plays.

While gaming machines, including feature games, have been very successful, there remains a need for games that provide a player with enhanced excitement and increased opportunity of winning.

The foregoing examples of the related art and limitations related therewith are intended to be illustrative and not exclusive. Other limitations of the related art will become apparent to those of skill in the art upon a reading of the specification and a study of the drawings. Additionally, limitations and disadvantages of the related art may become apparent from review of other related art itself.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

An embodiment, by way of non-limiting example, provides an active display button that includes a housing portion and an engagement portion attached to the housing portion. The active display button also includes an active display disposed within the housing portion and visible through the engagement portion, and a switch mechanism coupled to the engagement portion.

Another embodiment, by way of non-limiting example, provides an active display button that includes a housing portion and an engagement portion attached to the housing portion. Also included is an active display disposed within the housing portion and visible through the engagement portion wherein the active display further includes a rotating indicator. Additionally, a switch mechanism is coupled to the engagement portion.

In yet another embodiment, by way of non-limiting example, a game apparatus is provided that includes an active display button that includes a housing portion and an engagement portion attached to the housing portion. Additionally, an active display is disposed within the housing portion and is visible through the engagement portion wherein the active display further includes one or more lights. Also included is a switch mechanism coupled to the engagement portion.

Various other embodiments also provide for a game apparatus with an active display button that includes a housing portion and an engagement portion attached to the housing portion. An outcome of the random number generator may modify an element of an associated gaming device. The element may be a prize award, or the initiation of a game session, start of a bonus round, a number of wager lines, a number of spins of reels on the associated gaming device, a number of wager lines, a pay table, a payout percentage, a new game, triggering of group play, a game meter and a group play score.

Other embodiments also provide for a game apparatus with an active display button that includes a housing portion and an engagement portion attached to the housing portion. Triggering of the active display button may be based on a final result of the game, a scatter symbol, initiation of a bonus round of the gaming device and a signal from a remote server.

In addition to the example aspects and embodiments described above, further aspects and embodiments will become apparent by reference to the drawings and by study of the following descriptions.

BRIEF DESCRIPTION OF THE DRAWINGS

Example embodiments are illustrated in referenced figures of the drawings. It is intended that the embodiments and figures disclosed herein are to be considered illustrative rather than limiting—they provide examples of embodiments.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. These details are intended to be illustrative examples and not limitations of an inventive scope.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

It should also be noted that various gaming machine implementations mentioned in reference to specific embodiments may also be implemented via other embodiments even if it is not expressly stated to do so.

Embodiments described herein contemplate methods, systems and apparatuses directed to an active display button. In various embodiments, an active display button may generally be a button containing one or more elements that move when the button is engaged. By example, and not limitation, these elements may include one or more reels, be they mechanical or video, or perhaps a rotating indicator. The active display button may also include lights, vibratory motors and other experience-enhancing implements. The active display button may be installed on a gaming machine and operated in conjunction with the gaming device, separate from the gaming machine on which it is installed or perhaps as part of the operation of the gaming machine.

The specification refers to "active display buttons" and "action buttons." Both phrases may be considered equivalents in terms as used herein. An active display button is capable of displaying a changing image, either by mechanical or non-mechanical mechanisms (such as a video display).

In various implementations, one or more reels, in an active display button, lights up and spins around to display multiple (e.g. 5) regions wherein each region typically contains a symbol or other indicia. An active display button assembly may include a stepper motor, a light board and a housing portion which may be utilized to mount the active display button on a gaming machine. When an engagement portion, coupled to the housing, is pressed, a switch mechanism is activated to cause the one or more reels to spin. Typically, the engagement portion will not contact the one or more reels.

Figure 1:
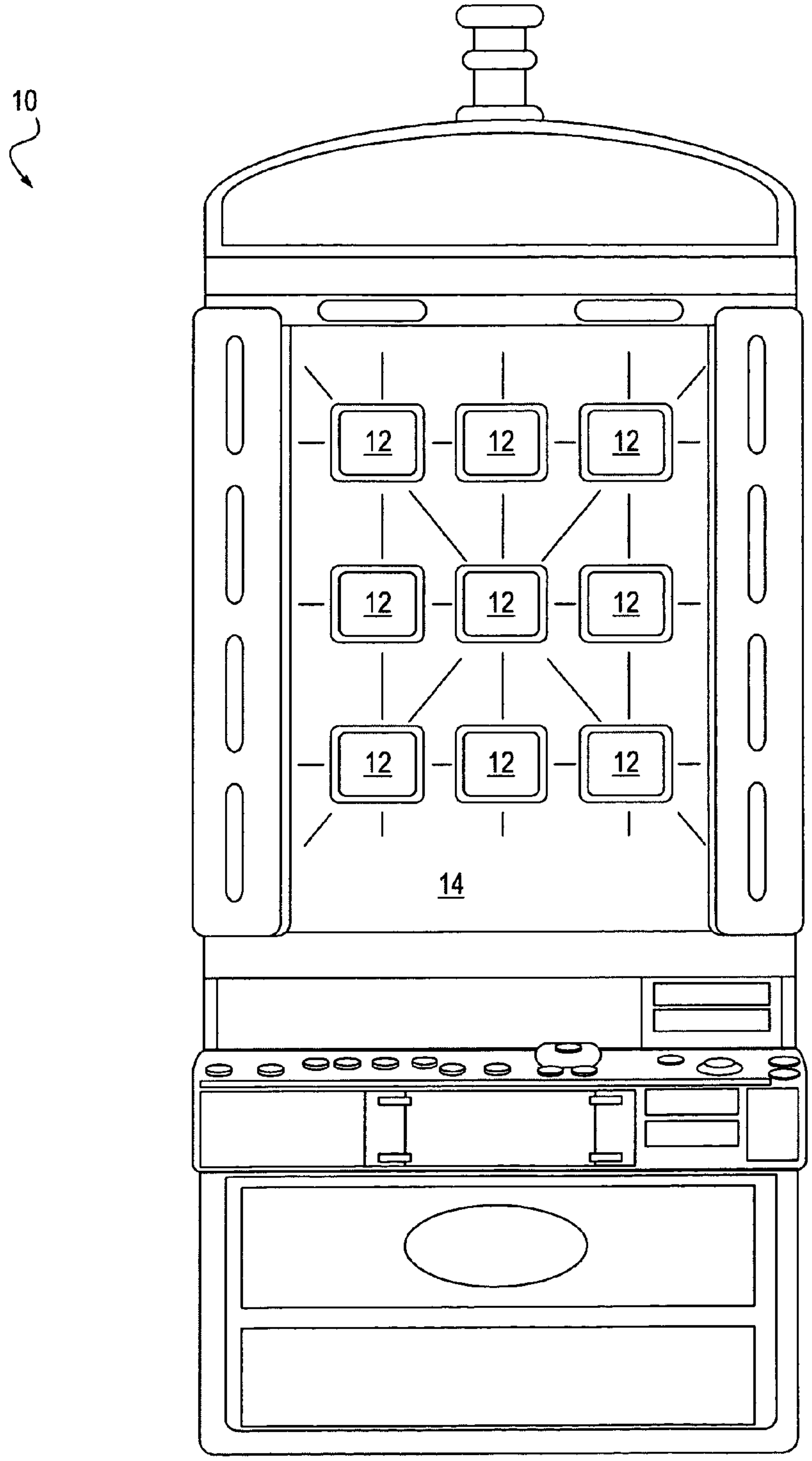
FIGS. 1-3 are illustrations of various examples of gaming machines with active display buttons.
Figure 2:
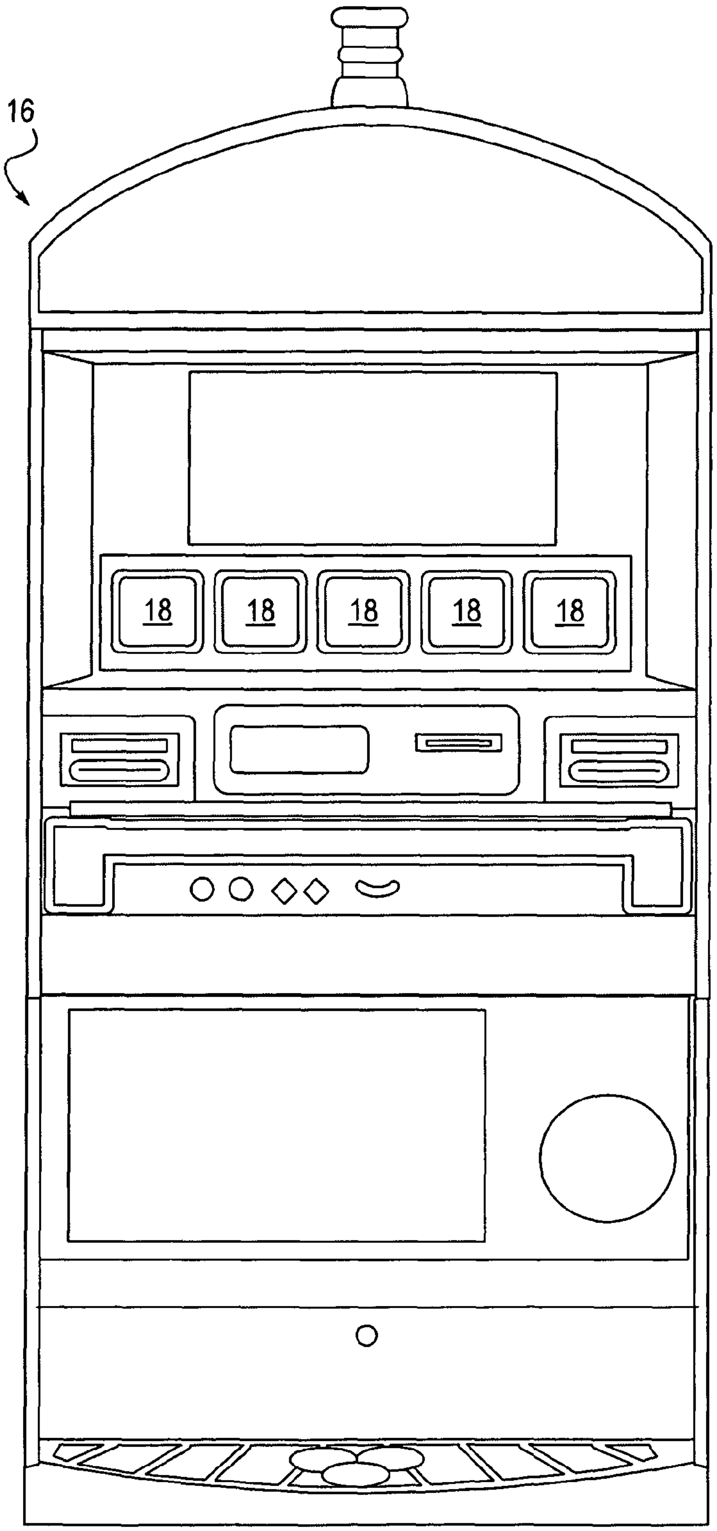
Figure 3:
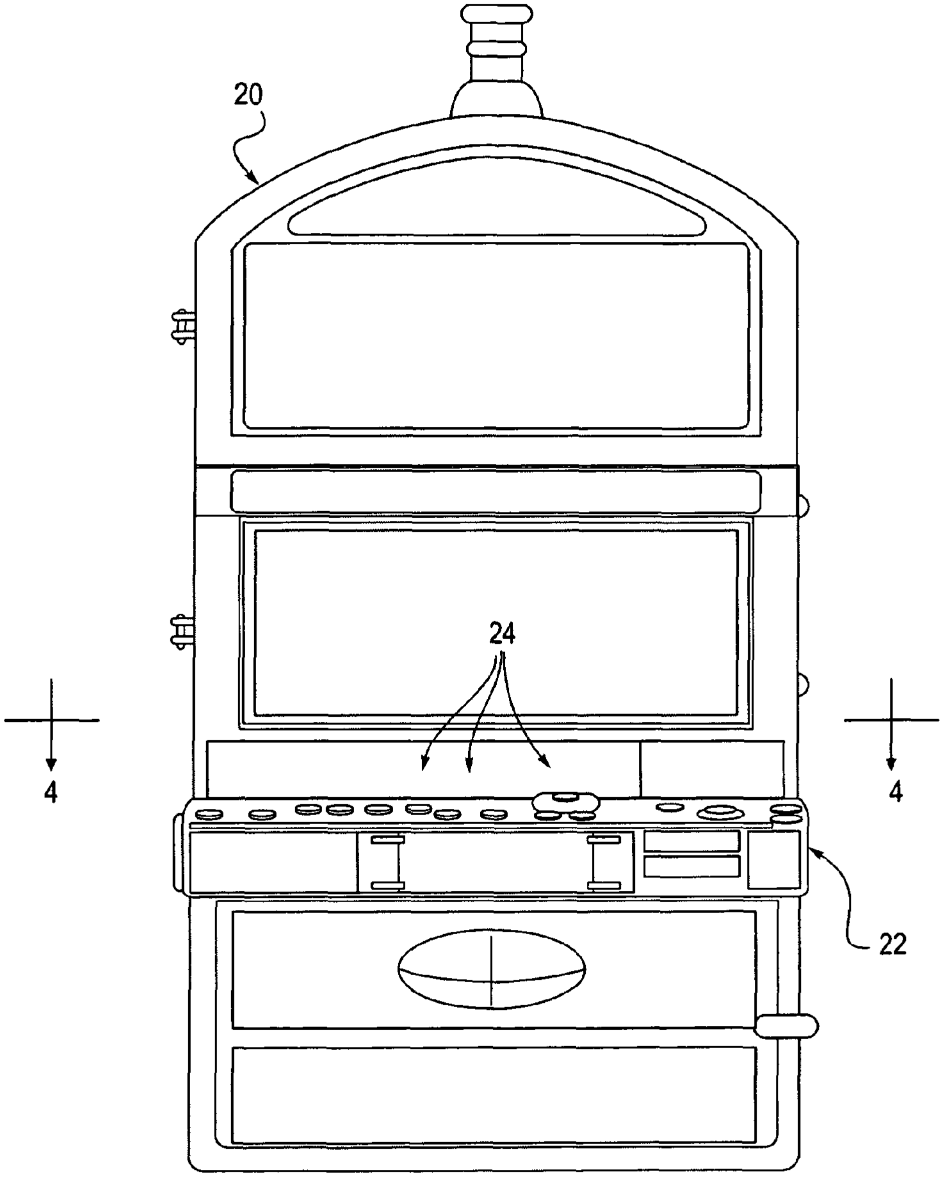
Figure 4:
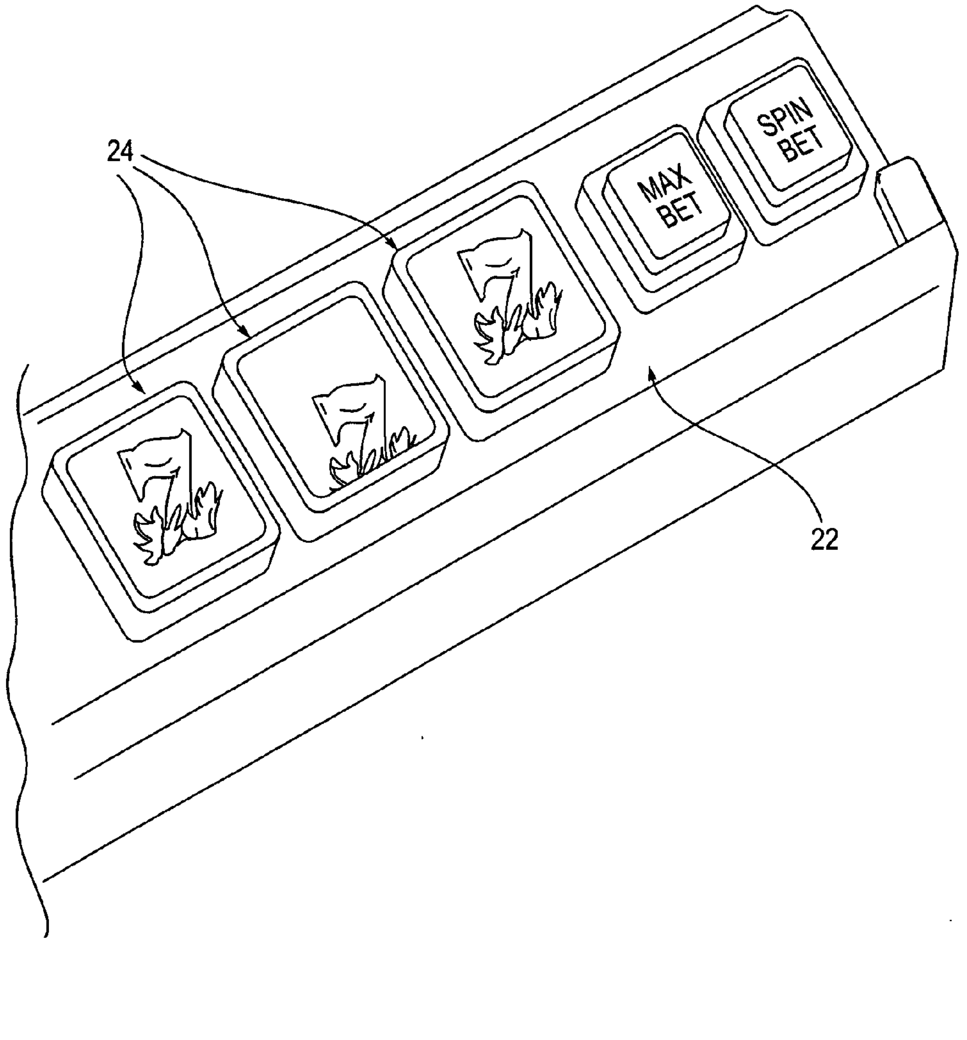
FIG. 4 is an illustration, by way of example, of active display buttons on a console of the gaming machine of FIG. 3 along line 4-4.

An active display button may be installed on various gaming machines or in utilized in other environments. Some example installments on gaming machines are shown in FIGS. 1-3. For example, gaming machine 10, of FIG. 1, includes multiple active display buttons 12 on a surface 14. Gaming machine 16, of FIG. 2, has a line of active display buttons 18. FIGS. 3-4 depict a gaming machine 20 with active display buttons 24 on a console 22. FIG. 4 is a downward looking view of the console 22 as defined by line 4-4 of FIG. 3.

Active display buttons 24 may reels alternate embodiments perhaps include other types of displays. For example, an arrow or indicator may be utilized that spins inside an active display button. When spinning is complete, the indicator could point at one symbol of a number of available symbols. An example of such an implementation will be shown in a later section.

Other implementations may include a light box that shows a denomination or symbol and, optionally, a vibratory motor, or the like, to provide tactile feedback. For a reel implementation, pressing the button which contains the reels could cause the reels to spin. If there are multiple reels or perhaps multiple buttons each with a reel, depressing one button may cause all reels or buttons with reels to be activated or perhaps just that button that was depressed. A reel may show dollar amounts, button functions, or symbols. Halo or multi-color lighting may be implemented in an active display button. In one implementation, reels in a button may be activated by a remote server, a game machine and by a user before or after the button is pressed. The reels may also be stopped by the remote server, the game machine or the user depending on the implementation. It should also be noted that reels may be mechanical, video or combinations thereof.

Activation of an active display button, in various implementations, may be triggered by various events. These events may include, by way of non-limiting example, a wager amount, a number of wagers, a number of wins, a number of losses, a scatter symbol, start of a game, end of a game or other game-related triggers. As previously stated, an active display button may also be triggered by other events that are not tied into a gaming machine upon which the button is installed. Active display buttons may be triggered for a player specifically identified for a bonus or perhaps a specific group of players as a bonus.

LCDs and LEDs and other light emitting, transmitting, or reflecting devices may also be used in conjunction with active display buttons. For example, LCDs may be used to show a progressive via sequential lighting up of the LEDs as new progressives are achieved. An LED display may show a number of spins remaining, time left and other related game information. LEDs may be implemented in a row or perhaps on a bezel around one or more active display buttons. LEDs, and other lights in an active display button, may have various states such as not lit, fully lit, half lit or percentages of fully lit.

Active display buttons may also be used in conjunction with group play. When a group play event is triggered, every qualified player can have their active display button enabled. Players could press their active display button to generate their group play scores. The main game screen may not have to do anything except show the competition (who is leading). The active display button may light up to indicate it is active. It may be time-based for use in, for example, tournament mode. In a horseracing-type group play scenario, the active display button may spin to choose which user's horse is in a horseracing group bonus feature.

Also for group play, active display buttons may randomly light up to indicate a tournament bonus has been triggered by a player in the bank. Once illuminated, the player would be alerted to press the active display buttons to try and get the high score in the time-based tournament. In alternate embodiments, tournament reel-type active display buttons utilize bars and seven other symbols. The player, for example, may hold up to 2 sevens and re-spin, in hopes of achieving a higher score. The tournament may last as long as the active display buttons are lit. In one implementation, the lights of the active display buttons may start to blink to signal that tournament mode will be ending within a certain time period.

An active display button may also be utilized as a game unto itself, in some embodiments. Examples include, but are not limited to an active display button that is skill-stop based wherein pressing or releasing the active display buttons stops a related reel, wheel or perhaps indicator. Another variation could be to depress the active display button when a certain light state is shown such as half lit or fully lit and/or in combination with reel, wheel or indicator movement.

It should be understood that while terms such as 'depress' are being utilized, an active display button may also by 'depressed' by touching it if the button is touch sensitive. A touch button may also be inductively, capacitively or similarly coupled to a switch mechanism. Alternatively, depressing or merely touching an active display button are not the only ways to active it. A rocking motion, sliding motion and other methods may also be employed. Further, the entire assembly may move, not just a top portion. The foregoing examples are merely illustrative and non-limiting.

Another example of an active button display utilized as a game includes using five sets of three-reel active display buttons to play a "Hot Shots"-type game; using a nine-active display button matrix on the body of a gaming machine to play tic tac toe, such as the gaming machine 10 of FIG. 1; and a nine-active display button matrix on the body of gaming machine 10 as a three-reel game—the three active display buttons in each of the three columns represent the three positions of the reel—all nine active display buttons can be pressed separately to the associated reels.

Further examples include using a row of five adjacent active display buttons with reels on a gaming machine such that the buttons have skill-based hold and re-spin features; using a row of five adjacent active display buttons with reels on the body of a gaming machine with an overhead monitor—with max bet, after each spin of the active display buttons, the previously selected symbols move to the overhead monitor. The overhead monitor displays the results of the last five games. If at any point three or more like symbols are adjacent, the player receives a bonus award.

Yet another example is active display buttons on the body of the gaming machine in the form of a pyramid. The player could get an up arrow (move up 1 level), a value (stopper), or a symbol (adjacent symbols move player up 1 level). The values increase as the player ascends the pyramid.

As can be seen, active display buttons may be used to implement a wide variety of games from games of chance to games of skill. Active display buttons may be used for a variety of other purposes such as in vending machines, instruments, business equipment, etc. Again, the preceding list is merely exemplary and limiting as active display buttons may be used in almost any conceivable environment.

An active display button may also be used to interact with a game of a gaming machine. An example non-limiting list includes use of an active display button as a sixth reel on a five-reel game if a maximum bet is wagered, use as a wager multiplier, use as a win multiplier, outcomes of an active display button may award spins on a main set of reels of a gaming machine and outcomes of an active display button may trigger bonus rounds on the gaming machine and perhaps also for a group of players. In certain embodiments, an active display button may depressed by a player and an associated main game may play if the player has enough game credits. Optionally, the active display button could spin and the main game would not play. A wager amount, which may be an entire wager, may be applied to the game associated with the active display button and an outcome of the related game. A player's prize may be displayed to the player via the active display button or on a display of the main game based upon a paytable for the denomination played.

Figure 5:
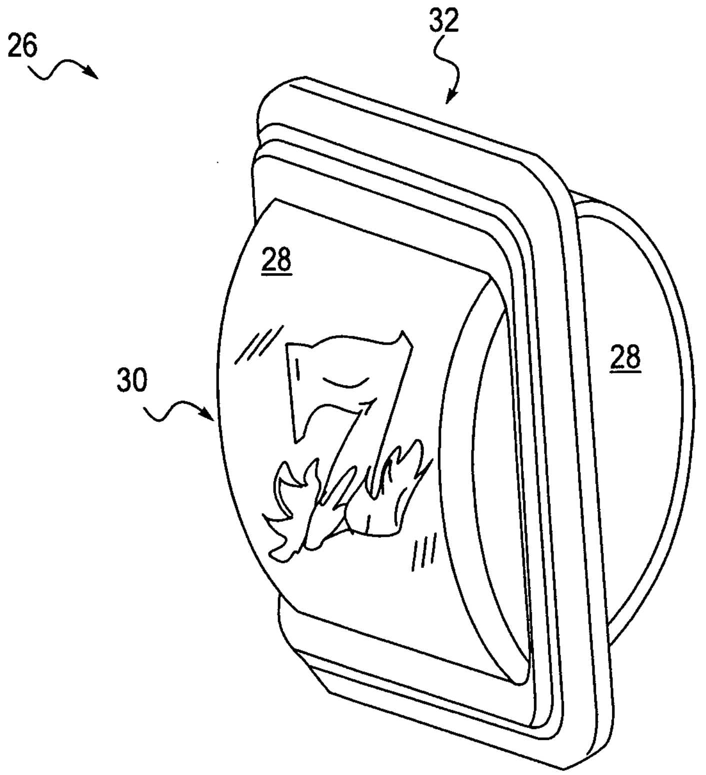
FIG. 5 is an example perspective view of an active display button.

The structure and operation of an example active display button will now be described in greater detail. Starting with the active display button 26 of FIGS. 5-6, an example active display button 26 includes a reel 28 an engagement portion 30 and a housing portion 32. While the operation of the active display button 26 may be described with reference to a gaming machine **9*a*** game of chance, it will be understood that the active display button has many uses other than in gambling environments.

Figure 6:
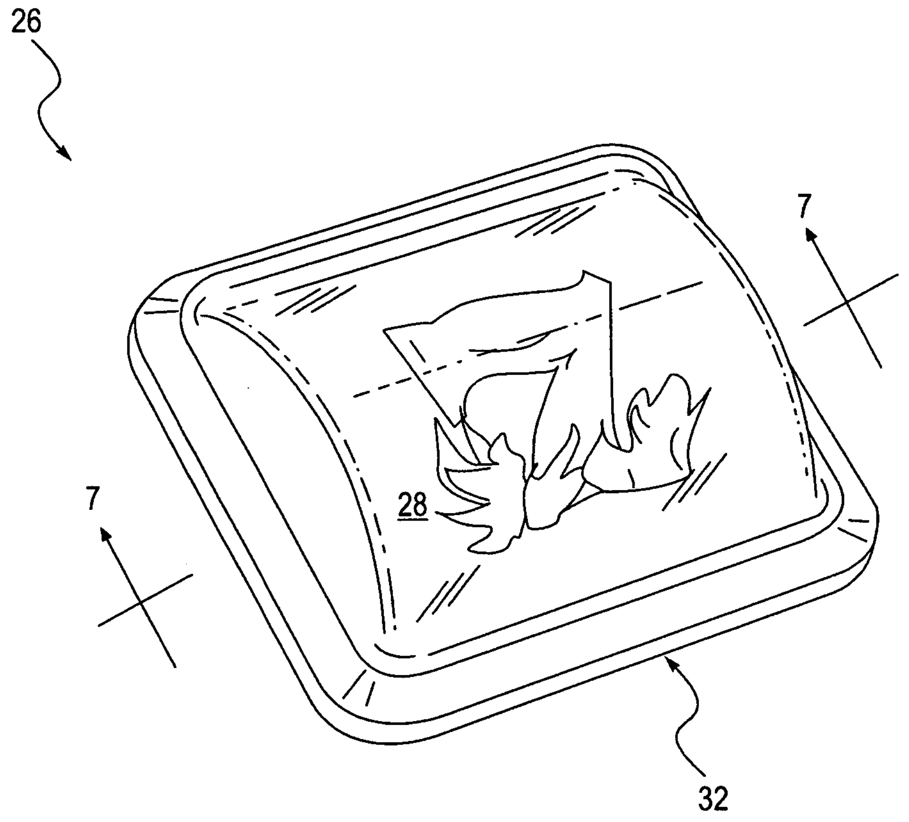
FIG. 6 is another example perspective view of an active display button.
Figure 7:
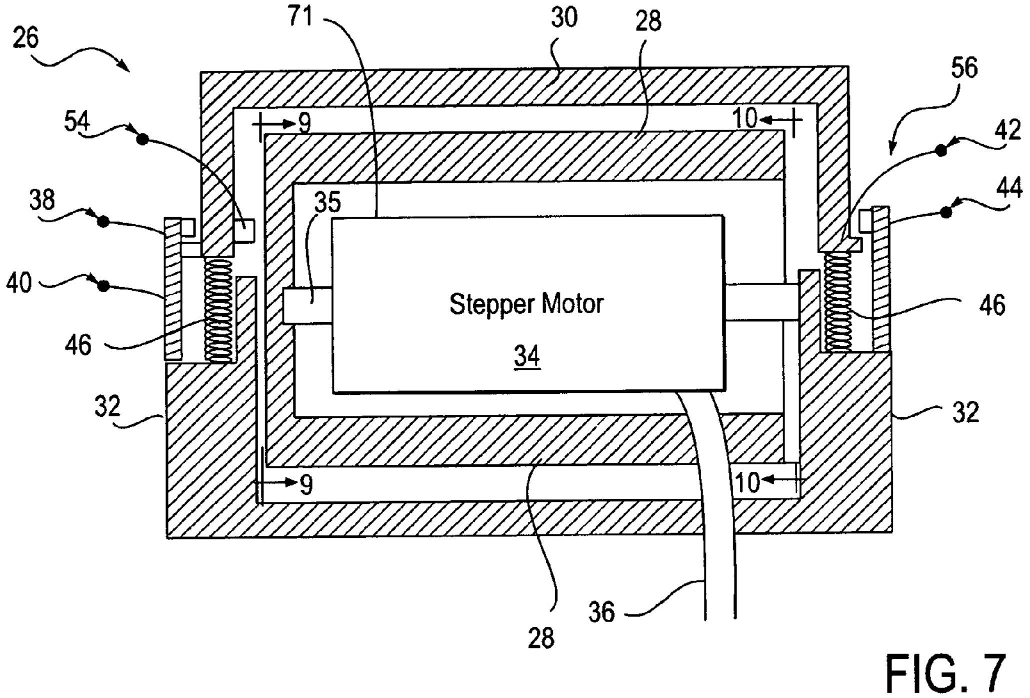
FIG. 7 is a cross sectional view of the active display button of FIG. 6 along line 7-7.

FIG. 7 is a cross-sectional view 34 of button 26 taken along line 7-7 of FIG. 6. In various implementations, a stepper motor 34 may be utilized to turn reel 28. A DC motor, or other equivalents, may also be utilized. Stepper motor 34 receives signals from wires 36. A switch 56 may comprise a pair of contacts, such as contacts 38/40 or contacts 42/44. Engagement portion 30, in this example, is biased upwardly by expansion springs 46. When engagement portion 30 is pressed, switch 56 may open. Springs 46 may be substituted with other equivalent devices to maintain engagement portion at a preferred position. Optionally included is an optical sensor 54 which detects a position of the reel 28 via an opening in axle 68 (see also FIG. 9).

Switch 56 is but one example of a switch mechanism. As used herein, a "switch mechanism" is any device which can function as an electrical switch. A switch mechanism may be mechanical such as switch 56, or, may be mechanical such as a capacitive, inductive or touch-sensitive switch. Non-mechanical switches may be preferable in some situations because they may not require movement of any parts. Therefore, as used herein, when a switch mechanism is said to be "coupled" to an engagement portion, or other parts of the button, such coupling may be mechanical or non-mechanical as described above.

Figure 8:
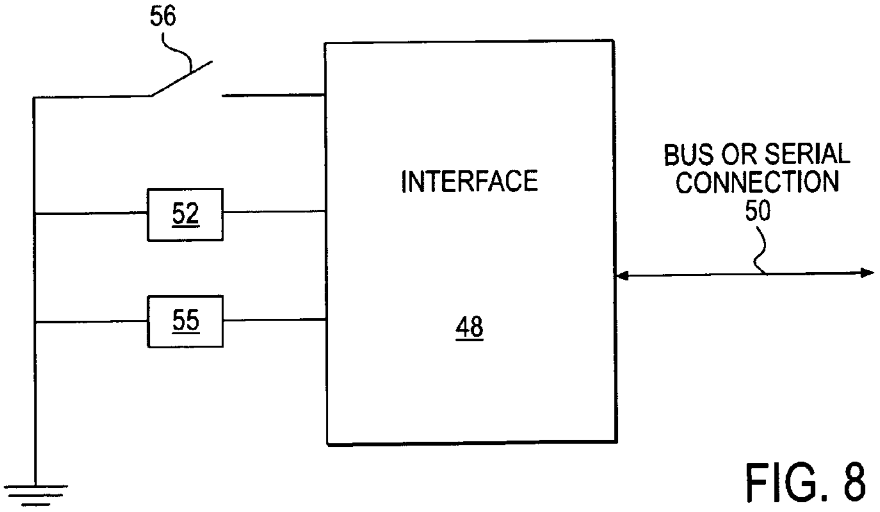
FIG. 8 is an example block diagram of an active display button such as those shown by way of example in of FIGS. 6-7.

FIG. 8 is an example block diagram of the action button of FIGS. 6-7, in accordance with an example embodiment. Included is an interface 48, a bus or serial connection 50 to, for example, a gaming machine motherboard, a motor controller 52 (coupled to, for example, wires 36 of motor 34), a sensor 54 and switch 56.

Figure 9:
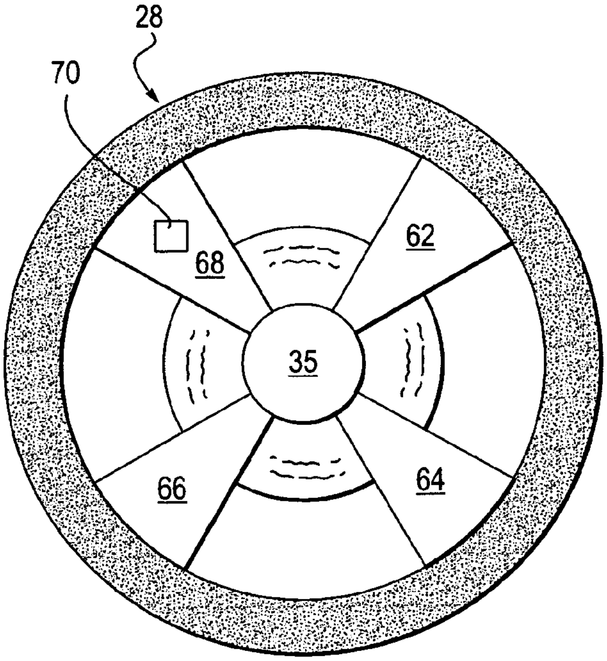
FIGS. 9-10 are example cross sections of the active display button of FIGS. 7-8 along lines 9-9 and 10-10 of FIG. 7, respectively.
Figure 10:
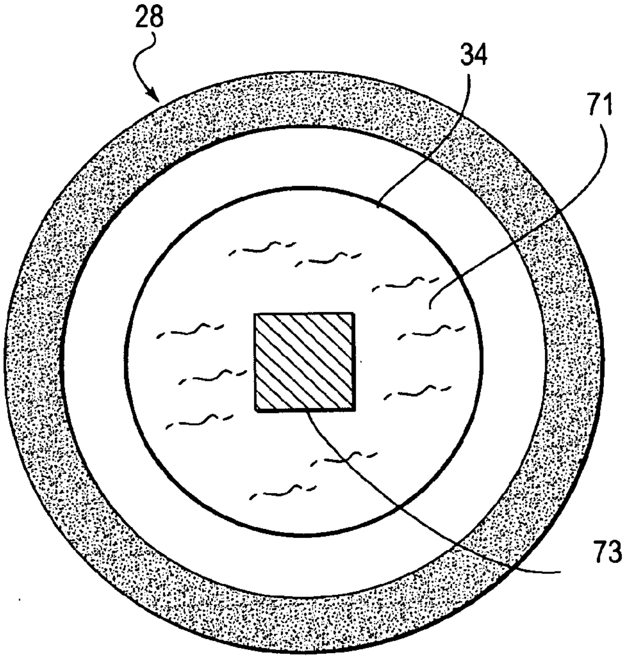

FIGS. 9-10 are cross sections of the action button of FIGS. 7-8 along lines 9-9 and 10-10 of FIG. 7, respectively. Referring to FIG. 9, reel 28 is rotated by the shaft of stepper motor 34 which is connected to spokes 62, 64, 66 and 68. Spoke 68 may include an opening 70 which may be detected by optical sensor 54 (see FIG. 7 to detect an index position of reel 28).

In FIG. 10 and the reel 28, stepper motor 34 and a support 73 which couples the stepper motor 34 to housing portion 32 and which the stepper motor 34, and reel 28, rotates around. The support 73 holds the body 71 of the motor 34 such that activating the motor 34 causes the shaft 35 to rotate the spokes 62-68 and thus the reel 28.

Figure 11:
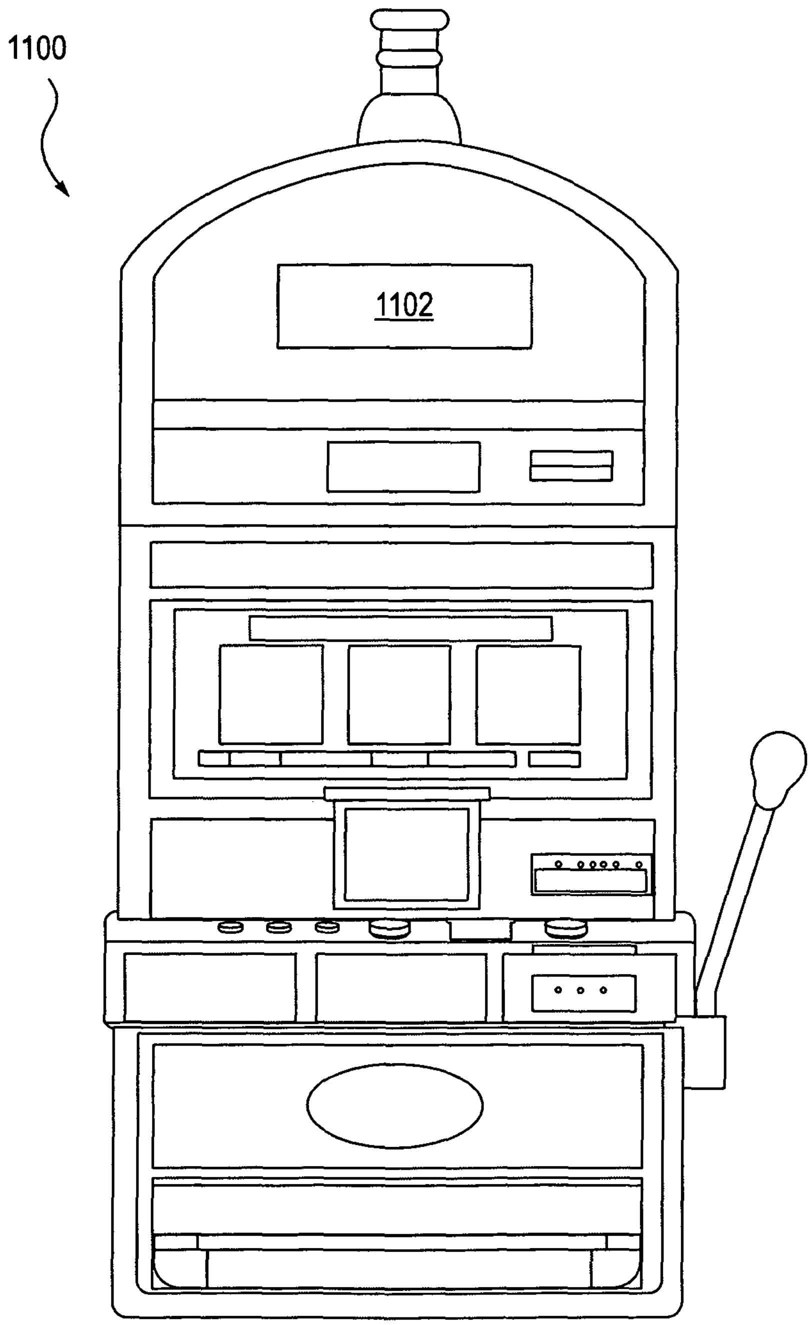
FIG. 11 is diagram of another gaming machine, set forth by way of example, with an active display button.
Figure 12:
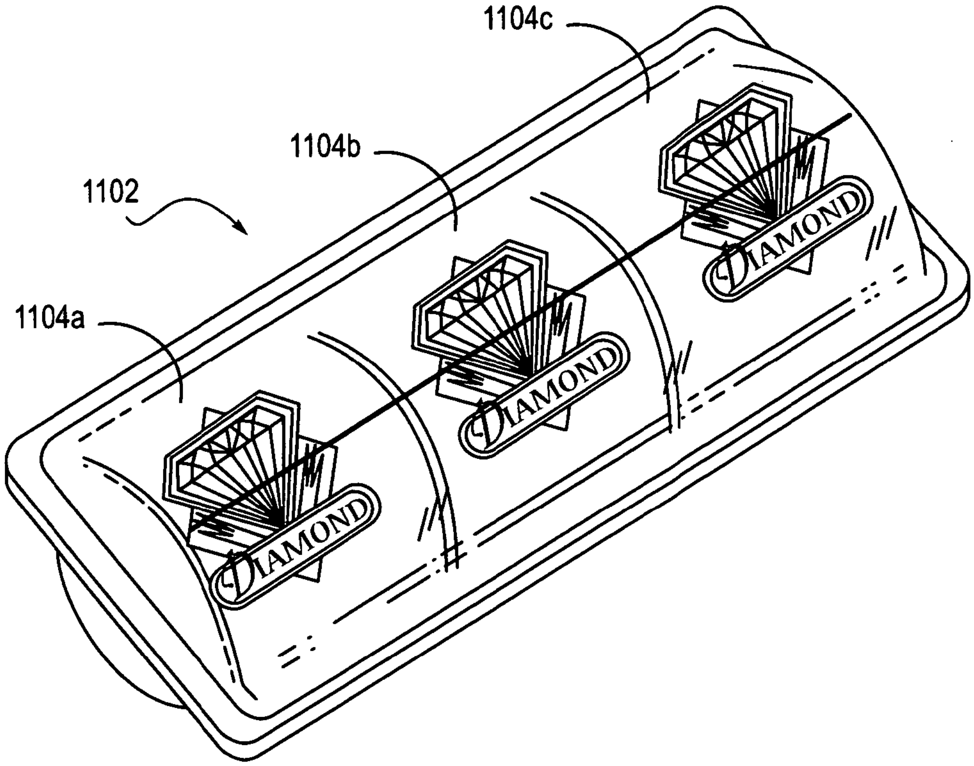
FIG. 12 is an example perspective view of an active display button that may be installed, for example, on the gaming machine of FIG. 11.
Figure 13:
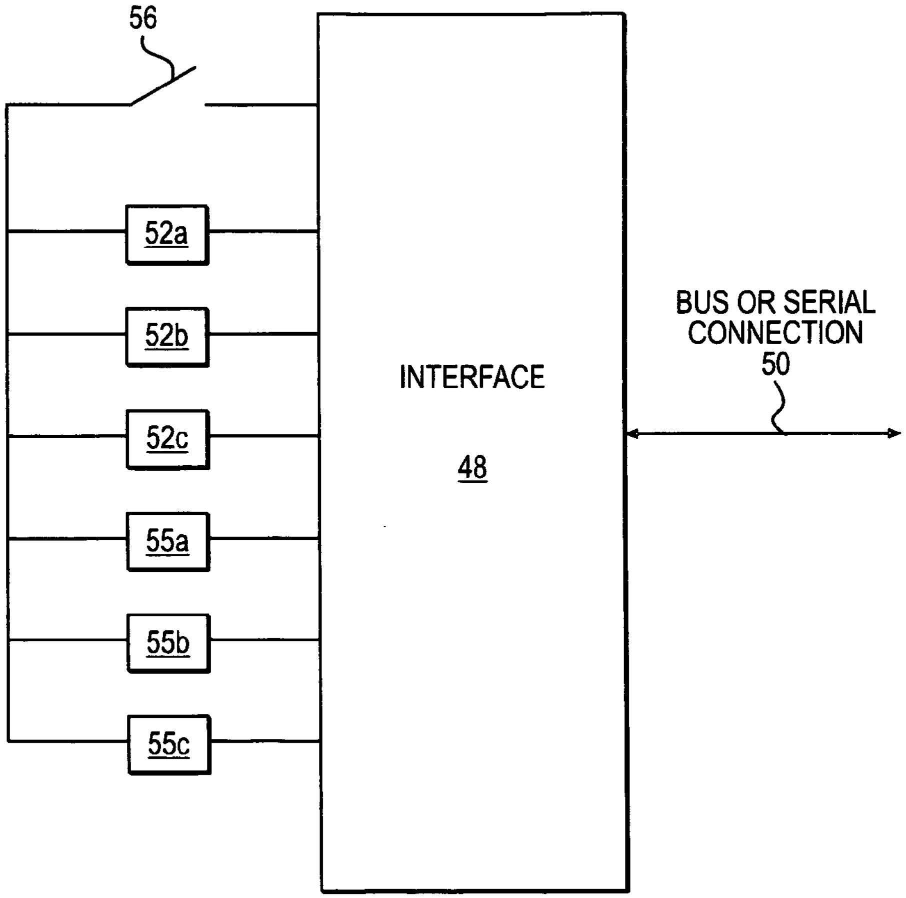
FIG. 13 is an example block diagram of an active display button such as the example button of FIG. 12.

By way of further example to illustrate additional embodiments, FIG. 11 is another diagram of an example gaming machine 1100 with an active display button 1102. FIG. 12 is an example perspective view for active display button 1102 and FIG. 13 is an example block diagram 1106 of the active display button 1102. Active display button 1104, in this embodiment, includes three reels 1104*a*, 1104*b* and 1104*c*. Block diagram 1106 is similar to block diagram of FIG. 8 with a tripling of components for the tripling of the number of reels. Each reel 1104*a*, 1104*b* and 1104*c* has a corresponding controller 52*a*, 52*b*, 52*c* and a corresponding sensor 55*a*, 55*b*, 55*c* in this exemplary embodiment.

Figure 14:
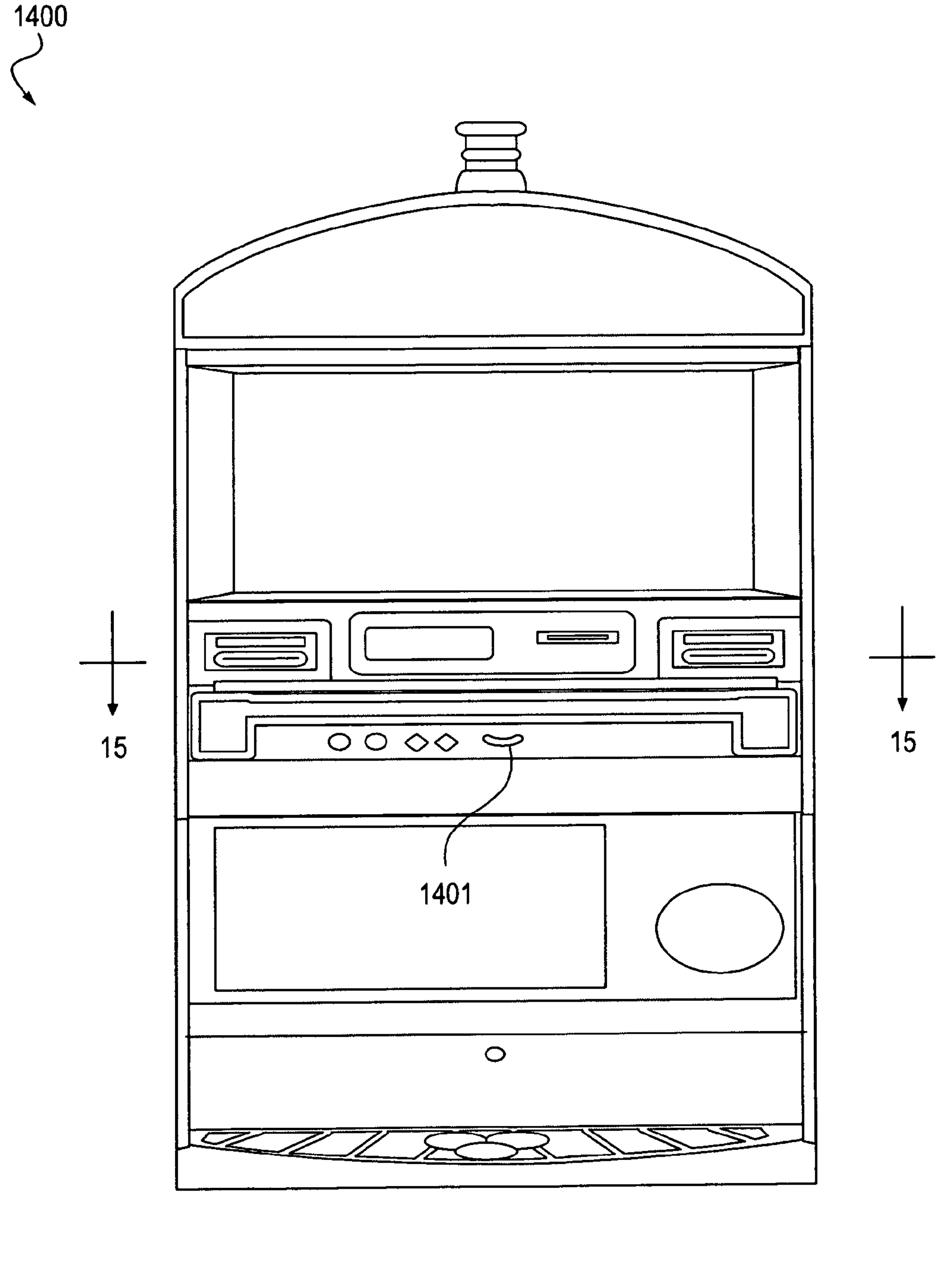
FIG. 14 is an illustration of an example gaming machine with an active display button.
Figure 15:
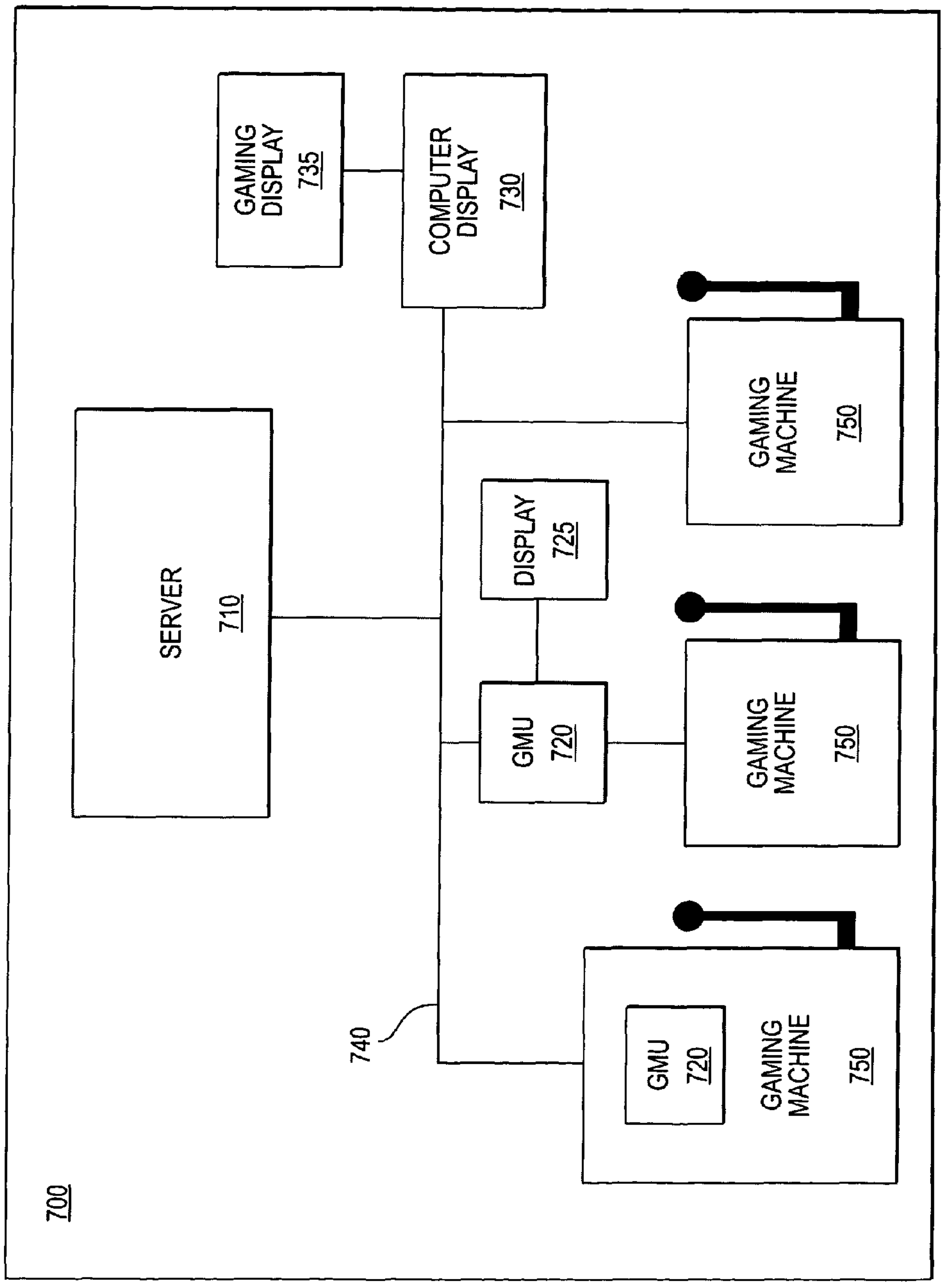
FIG. 15 is an example view of the active display button on a console of the gaming machine of FIG. 14 along line 15-15.
Figure 16:
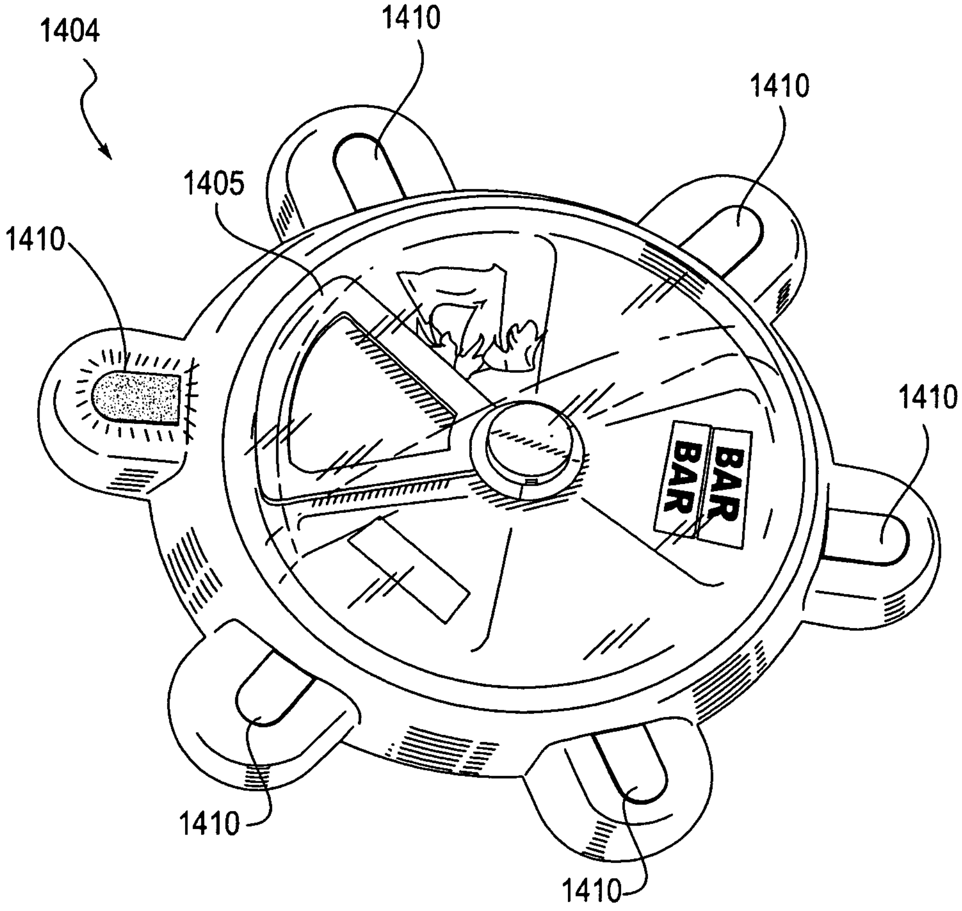
FIGS. 16-18 are perspective views of various additional active display buttons, in accordance with example embodiments.
Figure 17:
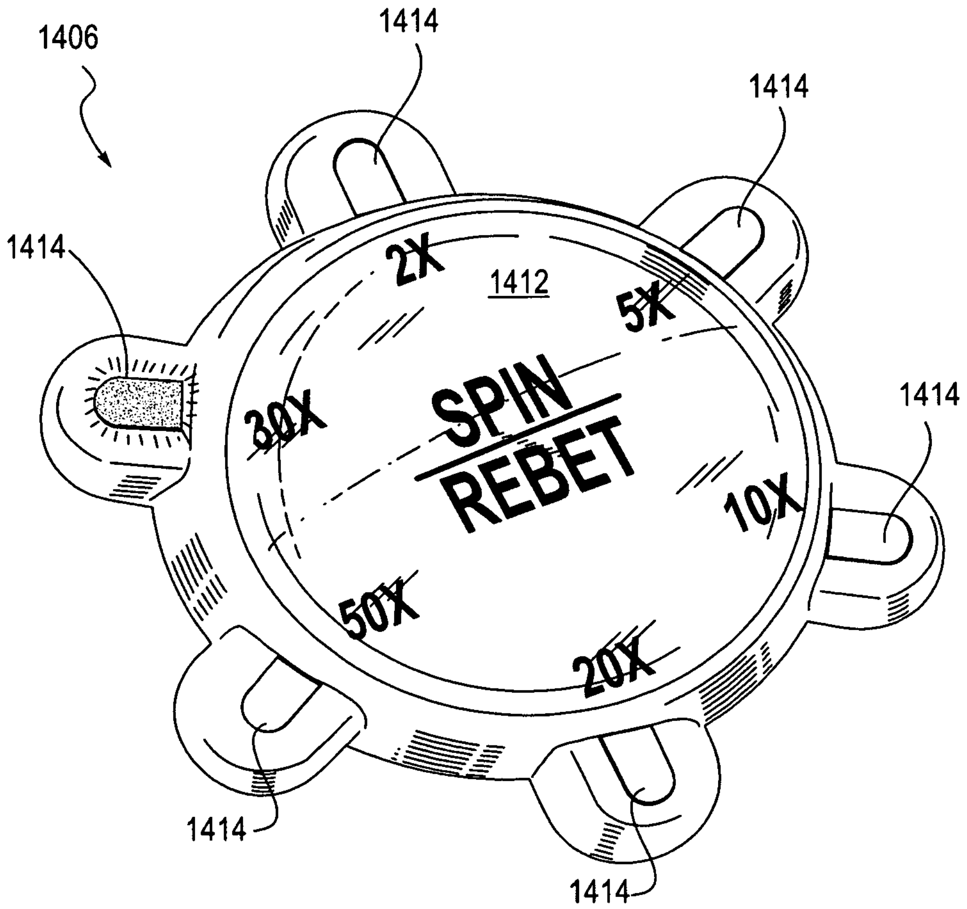
Figure 18:
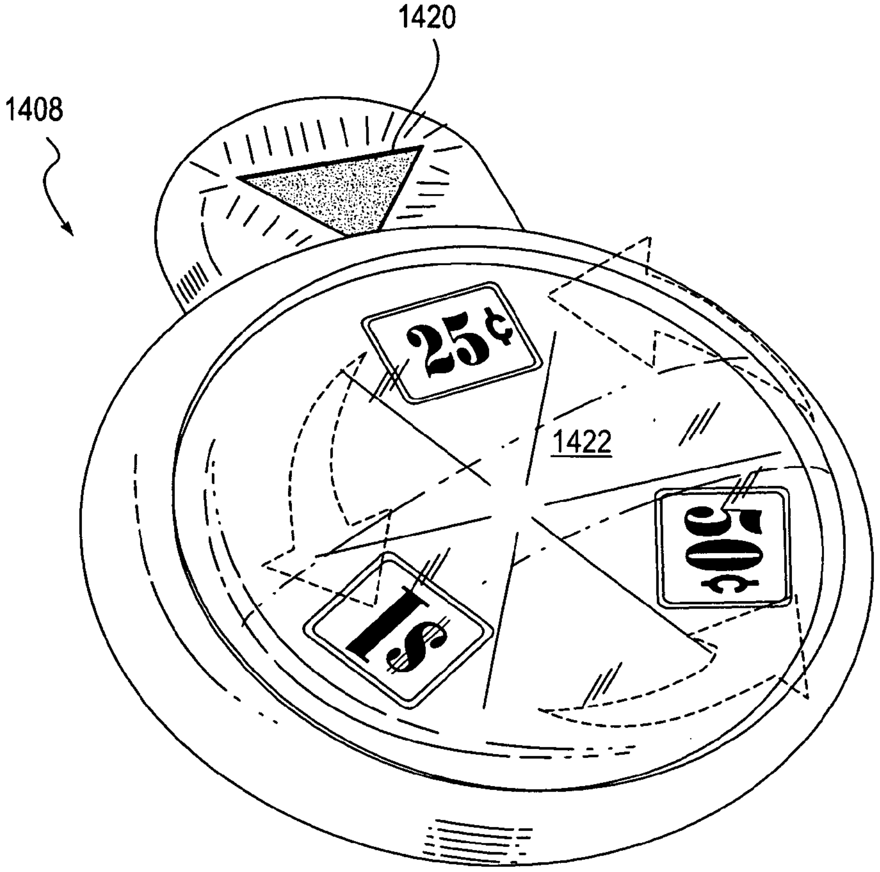

FIG. 14 illustrates another example gaming machine 1400 with an active display button 1401. FIG. 15 is illustrates active display button 1401 taken along line 15-15 of FIG. 14. FIGS. 16-18 are perspective views of various active display buttons 1404 and 1406 in accordance with example embodiments for button 1401. Button 1408 is yet another example alternate example. Buttons 1404, 1406 and 1408 all may be implemented on gaming machine 1400 or other gaming machines in alternate deployments.

In FIG. 16, button 1404 includes a rotating indicator 1405 and six LEds 1410 equally spaced around the perimeter of button 1404. LEDs 1410 can light up as indicator 1405 passes by each one and when indicator 1405 stops spinning, a corresponding LED can, for example, light up for a period of time. Other implementations are possible.

In FIG. 17, button 1406 includes a face 1412 and six LEDs 1414 equally spaced around the perimeter of button 1406. LEds 1414 may be used to simulate a spin in that each LED 1414 may light up in sequence in either direction, or may, for example, randomly to indicated a currently selected portion of face 1412. When a final selection of face 1412 is made, a corresponding LED 1414 will remain lighted for a period of time to indicate the final result.

For button 1408, one LED 1420 is included and face 1422 spins. LED 1420 may blink or remain unlit while face 1422 spins. When face 1422 stops, LED 1420 may, for example, remain lit for a period of time.

Figure 19:
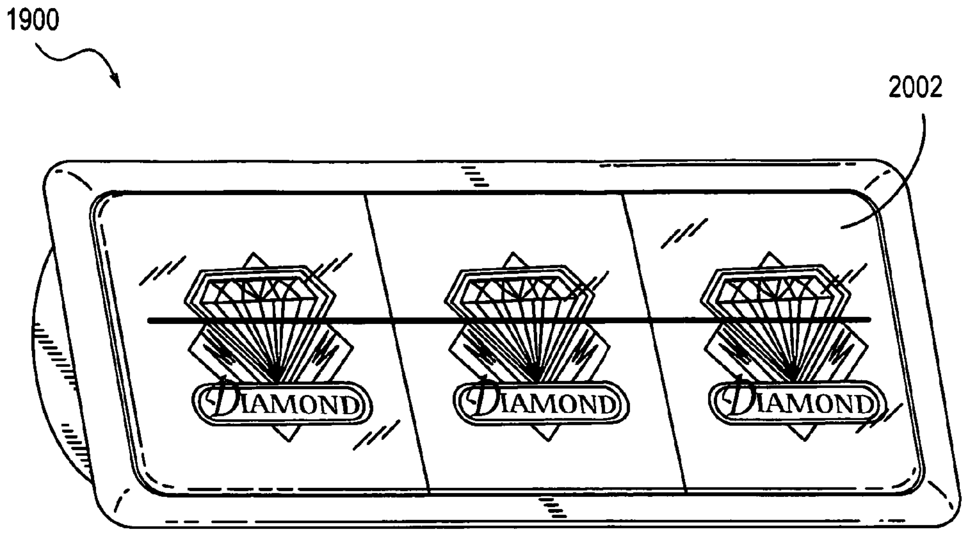
FIG. 19 is a perspective view of a video reel active display button, in accordance with an example embodiment.
Figure 20:
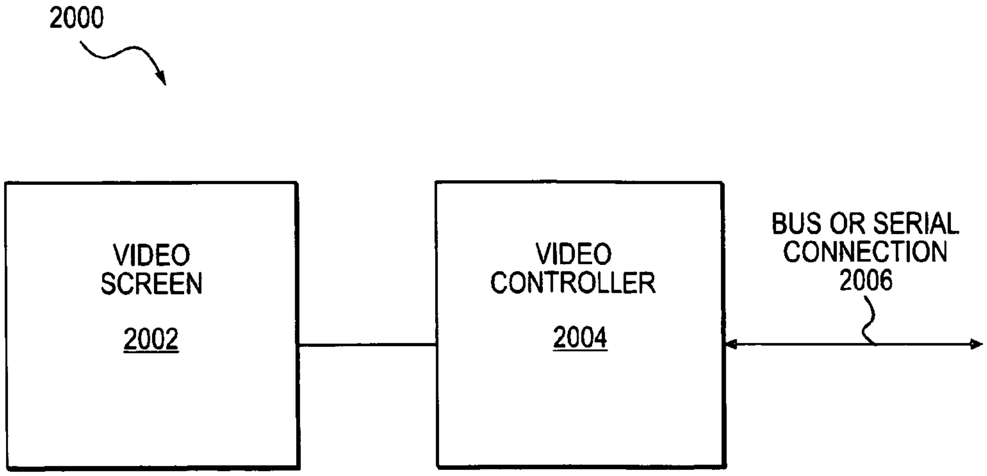
FIG. 20 is an example block diagram of an active display button such as the active display button of FIG. 19, in accordance with an example embodiment.

Yet another embodiment for illustration is that of FIG. 19 which is a perspective view of a video reel active display button 1900 may have a small rectangular flat panel display 2002. FIG. 20 is an example block diagram 2000 of the active display button 1900 of FIG. 19 for button 1900. Diagram 2000 includes a flat panel display on "video screen" 2002 coupled to a video controller 2004 which in turn is coupled by a bus or serial connection 2006 to, for example, a motherboard or other controlling device. Alternatively, the video controller may be provided remotely.

Figure 21:
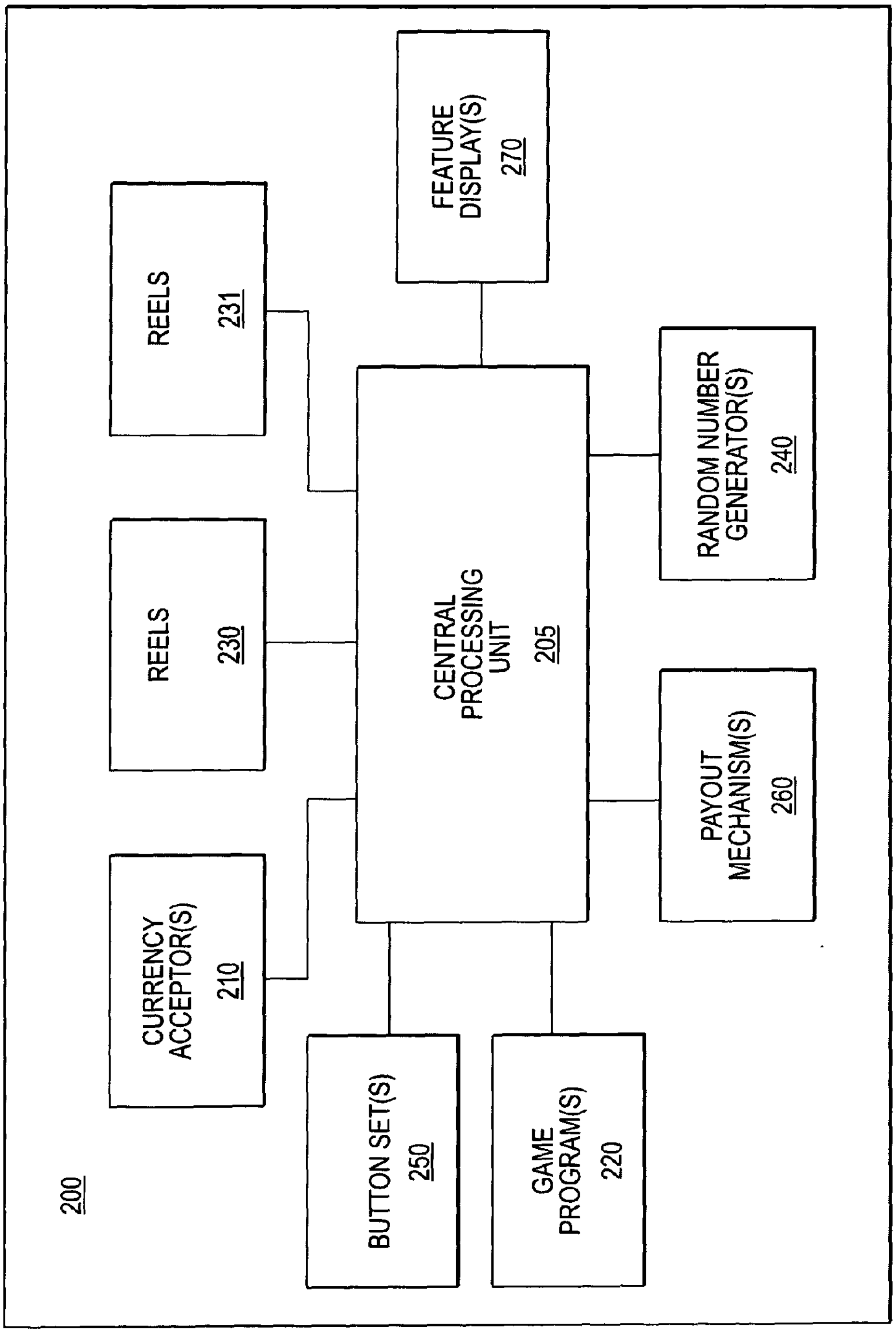
FIG. 21 is a block diagram illustrating examples of physical and logical components of a gaming machine, in accordance with an example embodiment, which may employ active display buttons.

FIG. 21 is a block diagram illustrating examples of physical and logical components 200 of the gaming machine 100 of FIG. 1. Included is a central processing unit 205 to which various components are coupled. Those components include a ticket/bill acceptor(s) 210, reel sets 230 and 231, feature display(s) 270, random number generator(s) 240, payout mechanism(s) 260, game program(s) 220 and button set(s) 250.

CPU 205 may be a processor mounted on a gaming motherboard. For example, CPU 205 may be a microprocessor made by Intel, AMD or others. The gaming motherboard may be mounted with other components, similar to those that may be found on a personal computer motherboard, and is operable to be loaded with a gaming machine operating system ("OS") such as an Alpha OS installed within a Bally S900, M9000 or CineVision™ slot machine. CPU 205 executes a game program 220 that causes reel sets 230, 231 to display a game.

When a player has inserted a form of currency such as, for non-limiting example, paper currency, coins or tokens, cashless tickets or vouchers, electronic funds transfers or the like into the ticket/bill acceptor 210, a signal is sent to the CPU 205 which, in turn, assigns an appropriate number of credits for play. The play may further control the operation of a gaming machine, for example, to select the amount to wager via, for example, electromechanical or touchscreen buttons 250. In addition, the button sets may include active display buttons as described herein. The game may start in response to the player pushing one or more buttons 250 or an alternate mechanism such as a handle or touchscreen icon (not shown).

Random number generator 240 responds to instructions from CPU 205 to provide random results. In some embodiments, random number generator 240 may be physically separate from gaming machine 100; for example, it may be part of a central determination host system (not shown) which provides random game outcomes to CPU 205. Thereafter, the player may or may not interact with the game through electromechanical or touchscreen buttons 250 to change the displayed indicia.

CPU 205 under control of game program 220 (typically stored in read only memory or read/write memory) typically compares the final outcome to a pay table. The set of possible game outcomes may include a subset of outcomes related to the triggering of a feature game. In the event the displayed outcome is a member of this subset, CPU 205, under control of game program 220, may cause feature game play to be presented on feature display 270.

Predetermined payout amounts for certain outcomes, including game outcomes, are stored as part of game program 220. Such payout amounts are, in response to instructions from CPU 205, provided to the player in form of coins, credits or currency via payout mechanism 260, which may be one or more of a credit meter, a coin hopper, a voucher printer, an electronic funds transfer protocol or any other payout means known or developed in the art. CPU 205 may also maintains one or more sets of accounting meters (not shown) which encompass the credit meter, a wager meter and a win meter.

In various embodiments of gaming machines, game program 220 is stored in a memory device (not shown) connected to or mounted to the gaming motherboard. By way of non-limiting example, such memory devices include external memory devices, hard drives, CD-ROMs, DVDs and flash memory cards. In an alternative embodiment, the game programs are stored in a remote storage device. In one embodiment, the remote storage device is housed in remote server. The gaming machine may access the remote storage device via a network connection, a TCP/IP connection, a wireless connection or any other means for operatively networking components together. Optionally, other data including graphics, sound files and other media files for use with gaming machine 100 are stored in the same or a separate memory (not shown). Some or all of game program 220 and its associated data may be loaded from one memory device into another, for example, from flash memory to random access memory (RAM).

In one embodiment, the CPU 205 is operative to host multiple virtual machines that may be utilized to run various games, perhaps at a remote location. In another embodiment, the CPU 205 has multiple cores and each core is operative to run a gaming machine. In yet another embodiment, multiple CPUs are present and each CPU is operative to run a game on a gaming machine. In still yet another embodiment, CPU 205 contains more than one set of game instructions, each set corresponding to a different game.

Figure 22:
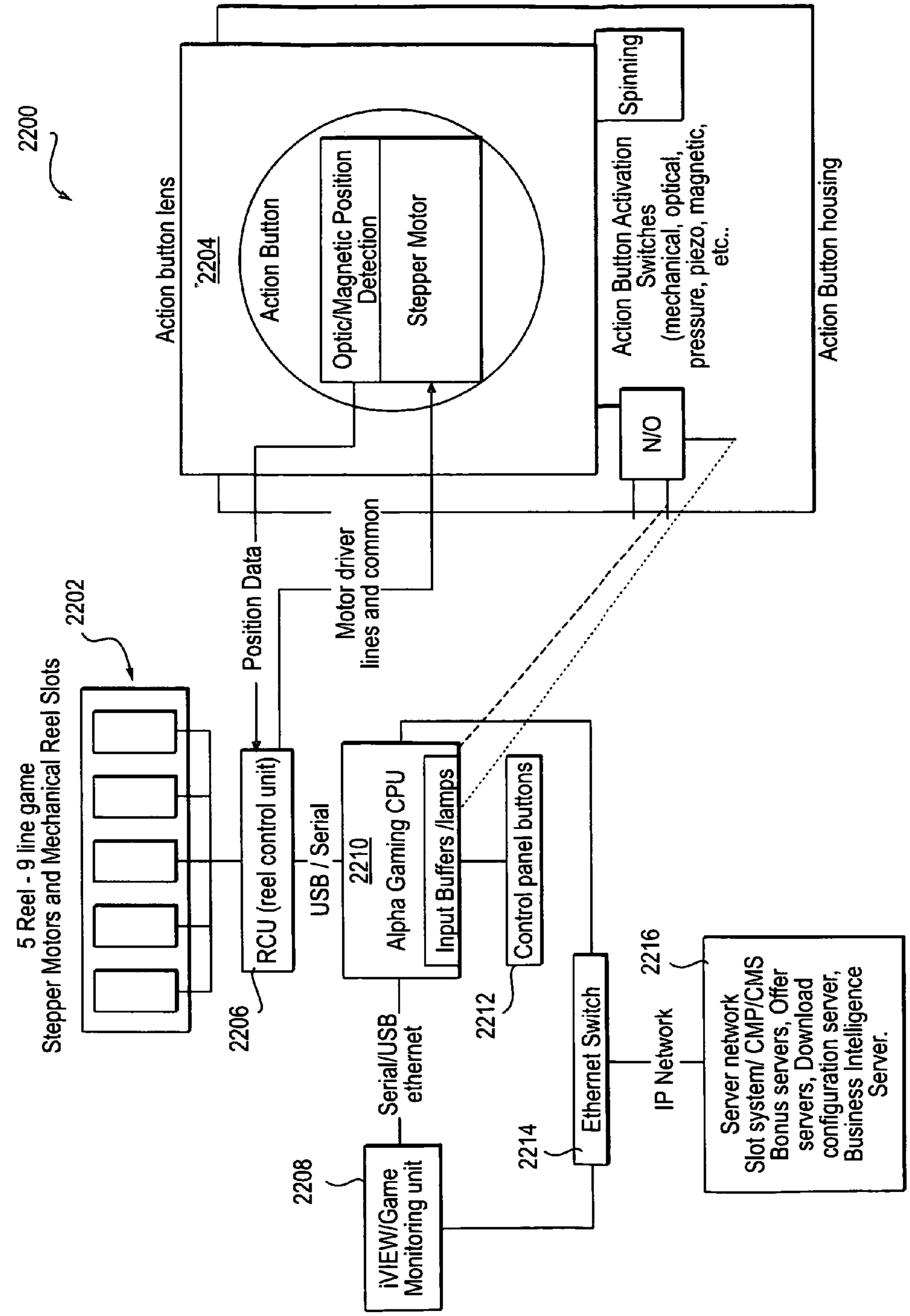
FIG. 22 is a block diagram illustrating examples of components of a gaming machine utilizing an active display button, in accordance with an embodiment.

FIG. 22 is a block diagram 2200 illustrating further examples of electrical components of a gaming machine utilizing an active display button, in accordance with an embodiment. Included are stepper motors 2202, an active display or "action" button 2204, a reel control unit 2206, a game monitoring unit 2208, a CPU 2210, buttons 2212, Ethernet switch 2214 and a server network 2216.

Action button 2204 is coupled to RCU 2206 and CPU 2210. Stepper motors 2202 are coupled to RCU 2206. CPU 2210 is also coupled to RCU 2206 and GMU 2208. Buttons 2212 are coupled to CPU 2210. GMU 2208 is coupled to switch 2214 which in turn is coupled to CPU 2210 and network 2216. In one embodiment the Reel control unit RCU 2206 may be contained within the action button 2204 itself. Commands from a gaming device or, or network server, in some implementations, may instruct the RCU 2206 to spin the action button indicator. An activation switch being depressed can cause messaging to be sent to any one of the aforementioned processors or servers. The action button 2204 may also be an IP-based peripheral directly addressable by authorized devices on the network.

Figure 23:
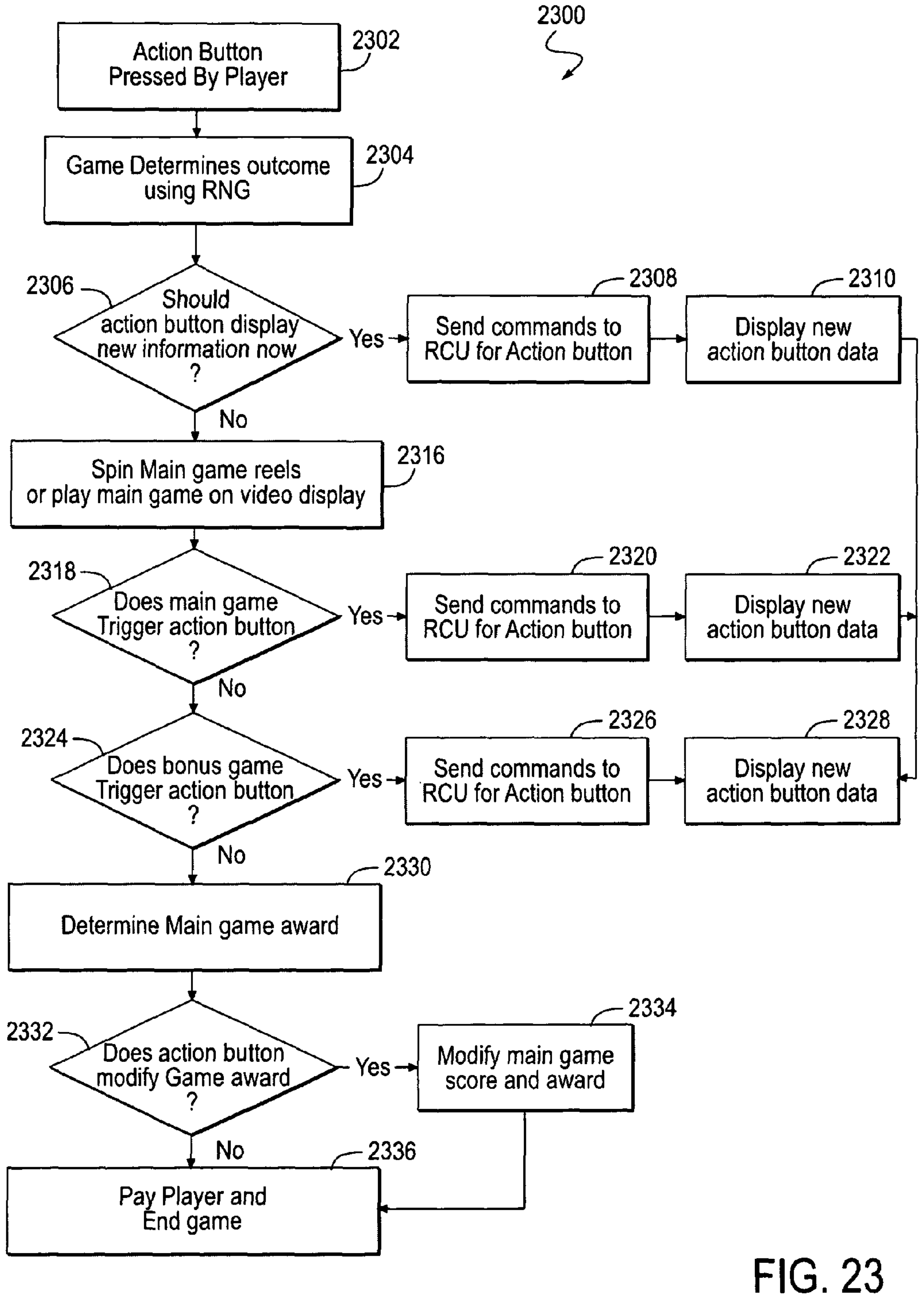
FIG. 23 is a flowchart, set forth by way of example and not limitation, illustrating a method for active display button play.
Figure 24:
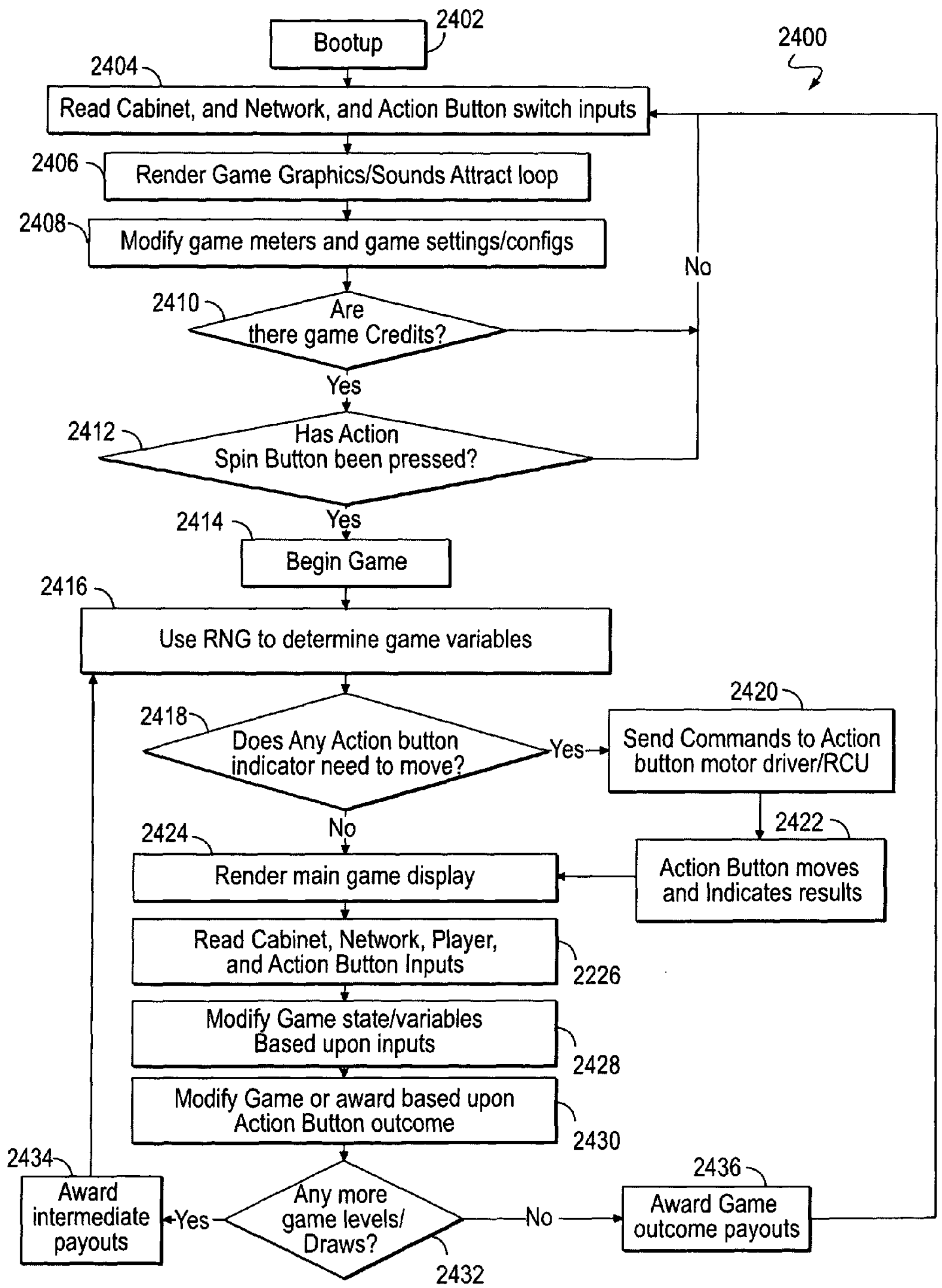
FIG. 24 is a flowchart, set forth by way of example and not limitation, illustrating a method for active display button interaction with a gaming machine.

FIG. 23 is a flowchart illustrating a method 2300 for operating an action button and FIG. 24 is a flowchart illustrating a method 2400 for action button interaction with a gaming machine, both set forth by way of example and not limitation. Both methods 2300, 2400 may be implemented by a CPU or processor such as a CPU 205 of FIG. 21.

Method 2300 begins when an action button is pressed by a player 2302 and a gaming machine determines an outcome 2302 using a random number generator. Next, it is determined if the action button should display new information 2306. If yes, commands are sent to a reel control unit for the action button 2308 and new action button data is displayed 2310. Otherwise, the main game reels are spun 2316 and it is determined if the main game should trigger the action button 2318. If yes, commands are sent to a reel control unit for the action button 2320 and new action button data is displayed 2322.

Otherwise, it is determined if a bonus game is triggered by the action button 2324. If yes, commands are sent to a reel control unit for the action button 2326 and new action button data is displayed 2328. Next a main game award is determined 2330 and it is further decided if the action button modifies the game award 2332. If yes, the main game score and award is modified 2334. Otherwise, or operation 2334, the payer is paid and the game ends 2336.

Method 2400 begins with a bootup 2402 of a gaming machine, such as any of the previously-shown gaming machines 10, 16, 20, 1100, 1400 or other types. Next, gaming machine cabinet, network and active display button switch inputs are read 2404, game graphics are rendered/sounds attract loop 2406 and game meters and game settings/configurations are modified 2408. It is then determined if a spin button has been pressed 2412. If no, operations 2404, 2406, 2408, 2410 and 2412 are repeated.

If operation 2412 is affirmative, then a game of the gaming machine is started 2414 and a random number generator is utilized to determine game variables 2416. At decision point 2418 it is determined if an indicator of an action button needs to move (2418). If yes, commands are sent to a reel control unit 2420 which is operable to turn reels of the action button. Reels of the action button then spin and indicate results of the spin 2422.

Otherwise, a main game display is rendered 2424; cabinet, network, player and action button inputs are read 2426; game state variables based on inputs are modified 2428 and the game or the award is modified based on the action button outcome 2430.

It is then determined if there are anymore game levels/draws 2430. If yes, intermediate payouts are awarded (2434) and control of the game is returned to operation 2416. Otherwise, game outcome payouts are awarded 2436 and game control is returned to operation 2404.

Figure 25:
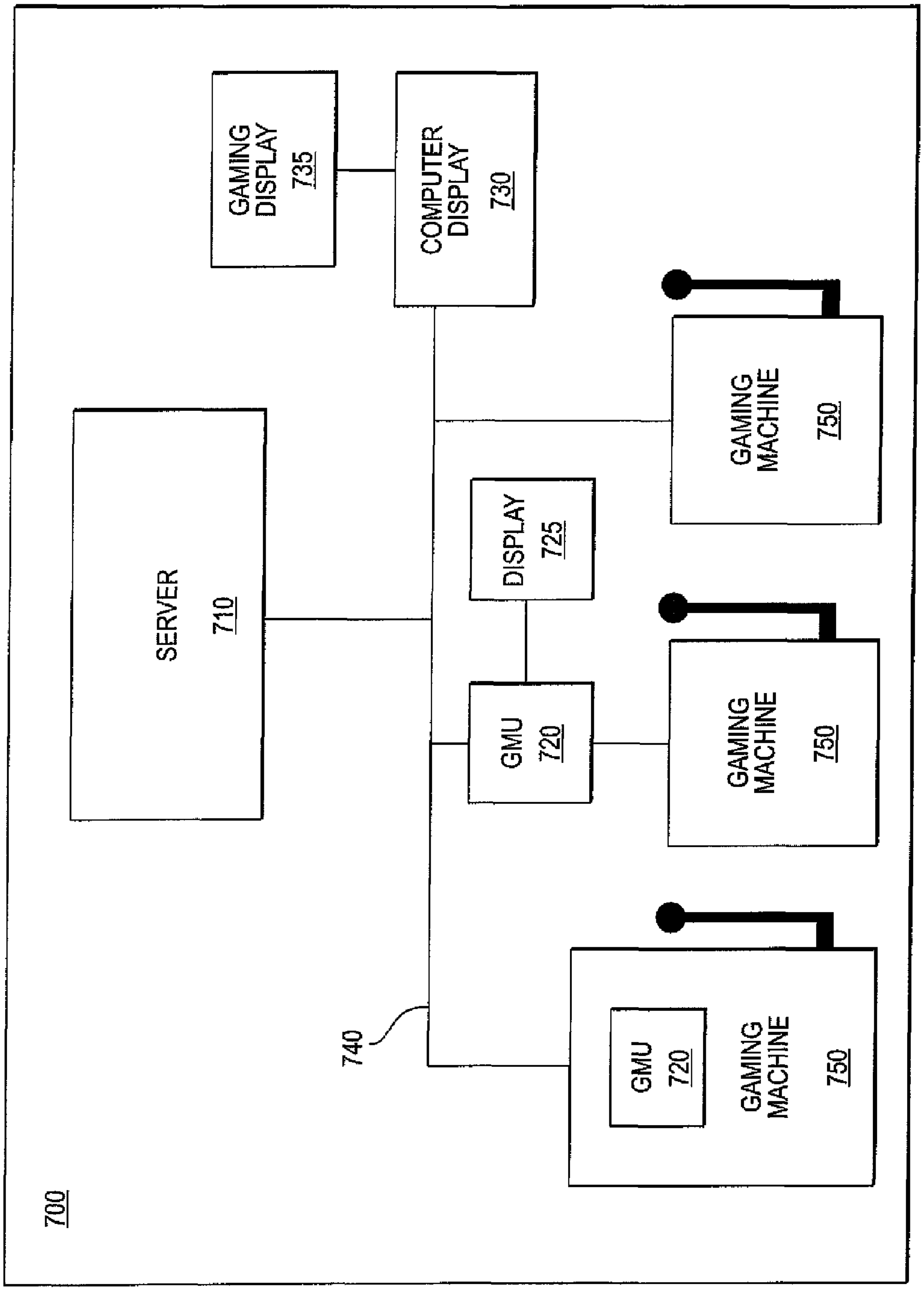
FIG. 25 is a block diagram illustrating elements of an example of a networked gaming system, in accordance with an embodiment.

FIG. 25 is a block diagram illustrating hardware elements of a networked gaming system 700, in accordance with an embodiment. System 700 includes server 710, gaming machines 750 and network 740 connecting gaming machines 750 to server 710. Additionally, gaming display computer 730 is shown to network 740. Server 710 may be selected from a variety server types. The type of server used is generally determined by the platform and software requirements of the gaming system. Examples of suitable servers are an IBM RS6000-based server, an IBM AS/400-based server or a Microsoft Windows-based server, but it should be appreciated that any suitable server may be used. The server 710 may be configured as a single "logical" server that comprises multiple physical servers. Gaming machines 750 operate similar to conventional peripheral networked terminals. Gaming machines 750 have a player interface such as a display, a card reader and selection buttons through which gaming machines 750 interact with a player playing a wagering game. The player interface is used for making choices such as the amount of a bet or the number of lines to bet. Gaming machines 750 also provide information to server 710 concerning activity on gaming machines 750 and provide a communication portal for players with server 710. For example, the player interface may be used or selecting different server-related menu options such as, but not limited to, transferring a specified number of credits from a player account onto the credit meter of the gaming machine, or for transferring credits from the gaming machine to a central player account.

In various embodiments, any of the gaming machines 750 may include one or more active display buttons. Networking components (not shown) facilitate communications across network 740 between the system server 710 and game management units ("GMU") 720 and/or gaming display control computers 730 that control displays for carousels of gaming machines. GMU 720 connects gaming machines to networking components and may be installed in the gaming machine cabinet or external to the gaming machine. The function of the GMU is similar to the function of the a network interface card connected to a desktop personal computer ("PC") and it may contain tracking software which provides notification to the casino of certain events on a gaming machine 750, including wins. Depending upon the casino management system, payouts on large wins at gaming machines 750 may be made directly to a player account managed by the host computer; in which case, the player is notified by of the GMU at gaming machine 750 that the player's account has been credited.

Some GMU's have much greater capability and can perform such tasks as presenting a game having a point-based award using a display 725 operatively connected to GMU 720. In various embodiments, GMU 720 is located outside or inside the gaming machine. Optionally, in an alternative embodiment, one or more gaming machines 750 connect directly to the network and are not connected to a GMU 720. Displays related to games offering a point-based award on gaming machines 750 or GMU displays 725 may also be presented on gaming display 735 by gaming display controller 730.

A gaming system of the type described above also allows a plurality of games, in accordance with the various embodiments, to be linked under the control of server 710 for cooperative or competitive play in a particular area, carousel, casino or between casinos located in geographically separate areas.

It should also be noted that a gaming system may also comprise other types of components and the above illustrations are meant only as examples and not as limitations to the types of components or games having a point-based award. Additionally, it may further be appreciated that each of the games could be operated on a remote host computer such that a player initiates play with the host computer over a network via the player interface and gaming machine 750 operates the respective gaming and video displays in conjunction with the game whose play is controlled by the remote computer.

It should furthermore be noted that certain combinations described herein may be used in non-gaming environments, such as in an arcade environment (e.g. with games of skill rather than games of chance, as indicators, etc. as will be appreciated by those of skill in the art.

It will be appreciated by those of skill in the art that a combinatorial effect of an action button with content of a gaming device is advantageous. For example, use of an action button may modify a typical game mechanic that would occur if use of the action button did not occur. In one embodiment, use of an action button may initiate start of a gaming device. In response, the gaming device may then further use the action button for additional play and outcomes which could perhaps be initiated via results of a random number generator. The random number generator may also be employed to activate the action button, randomly, after a gaming session, at a gaming device, ends. In a similar vein, the random number generator could randomly activate the action button during a gaming session at a gaming device. In any of those circumstances, an outcome of activation of the action button may be utilized to influence at least part of an outcome of the gaming session.

While a number of example aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. An active display button comprising:

a housing portion;

an engagement portion coupled to the housing portion;

a tactile feedback mechanism coupled to the housing portion;

an active motorized display disposed within the housing portion and visible through the engagement portion, said motorized display including a rotating indicator and a plurality of indicia and configured for movement to indicate at least one of said indicia through the engagement portion and a stepper motor coupled to said motorized display to move said rotating indicator to indicate said at least one indicia; and a switch mechanism coupled to the engagement portion;

wherein engagement of the engagement portion activates the active motorized display by a central processing unit coupled to a random number generator and in response to activation of the active display button based on a first outcome of the random number generator provides a display of the active display button, and then causes the central processing unit to activate the random number generator to modify the display of the active motorized display based on a second outcome of the random number generator.

2. The active display button as recited in claim 1 wherein the switch mechanism is capacitively coupled to the engagement portion.

3. The active display button as recited in claim 1 wherein the switch mechanism is inductively coupled to the engagement portion.

4. The active display button as recited in claim 1 wherein the switch mechanism is coupled to the engagement portion by a touch sensitive member.

5. The active display button as recited in claim 1 wherein the active motorized display comprises at least one reel provided with said plurality of indicia.

6. An active display button comprising:

a housing portion;

an engagement portion attached to the housing portion;

a tactile feedback mechanism coupled to the housing portion;

an active display disposed within the housing portion and visible through the engagement portion; and a switch mechanism coupled to the engagement portion;

wherein engaging the engagement portion includes detecting activation of the active display button by a central processing unit coupled to a random number generator and in response to activation of the active display button provides a display of the active display button based on a first outcome of the random number generator, and then causes the central processing unit to activate the random number generator to modify the display of the active display button based on a second outcome of the random number generator.

7. The active display button as recited in claim 6 wherein the second outcome of the random number generator modifies an element of an associated gaming device.

8. The active display button as recited in claim 7 wherein the element is a prize award.

9. The active display button as recited in claim 7 wherein the element is an amount to initiate a gaming session.

10. The active display button as recited in claim 7 wherein the element is start of a bonus round.

11. The active display button as recited in claim 7 wherein the element is a number of wager lines.

12. The active display button as recited in claim 7 wherein the element is a number of spins of reels on the associated gaming device.

13. The active display button as recited in claim 7 wherein the element is a pay table.

14. The active display button as recited in claim 7 wherein the element is a payout percentage.

15. The active display button as recited in claim 7 wherein the element is a new game.

16. The active display button as recited in claim 7 wherein the element is triggering of group play.

17. The active display button as recited in claim 7 wherein the element is a game meter.

18. The active display button as recited in claim 7 wherein the element is a group play score.

19. An active display button comprising:

a housing portion;

an engagement portion attached to the housing portion;

a tactile feedback mechanism coupled to the housing portion;

an active display disposed within the housing portion and visible through the engagement portion;

a switch mechanism coupled to the engagement portion; and wherein the active display button is activated in response to initiating a game of a gaming device associated with the active display button whereupon an image displayed by the active display is determined in response to a first outcome of a random number generator;

wherein the active display button is triggered based on results of game play;

wherein engaging the engagement portion of the active display button after being triggered modifies an element of the gaming device based on an outcome of the triggering of the active display button; and, subsequently, wherein the active display is modified in response to a second outcome of the random number generator.

20. The active display button as recited in claim 19 wherein the trigger of the active display button is based on a final result of the game.

21. The active display button as recited in claim 19 wherein the trigger of the active display button is based on a scatter symbol.

22. The active display button as recited in claim 19 wherein the trigger of the active display button is based on initiation of a bonus round of the gaming device.

23. The active display button as recited in claim 19 wherein the trigger of the active display button is based on a signal from a remote server.

* * * * *